(12) United States Patent
Yang et al.

(10) Patent No.: US 11,743,838 B2
(45) Date of Patent: Aug. 29, 2023

(54) METHOD FOR TRANSMITTING CAPABILITY INFORMATION INCLUDING POWER CLASS INFORMATION AND WIRELESS DEVICE

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 17/337,996

(22) Filed: Jun. 3, 2021

(65) Prior Publication Data

US 2021/0289450 A1 Sep. 16, 2021

Related U.S. Application Data

(63) Continuation of application No. 16/980,800, filed as application No. PCT/KR2019/004537 on Apr. 16, 2019, now Pat. No. 11,057,846.

(30) Foreign Application Priority Data

May 11, 2018 (KR) ........................ 10-2018-0054267

(51) Int. Cl.
*H04W 52/36* (2009.01)
*H04W 52/28* (2009.01)
(Continued)

(52) U.S. Cl.
CPC ........... *H04W 52/28* (2013.01); *H04W 52/36* (2013.01)

(58) Field of Classification Search
None
See application file for complete search history.

(56) References Cited

U.S. PATENT DOCUMENTS 10,412,571 B2 * 9/2019 Baghel ................. H04W 76/14
10,735,066 B2   8/2020 Mo et al.
(Continued)

FOREIGN PATENT DOCUMENTS

CN    103700924 A  *  4/2014
CN    108028471 A  *  5/2018  ............. H01Q 1/523
(Continued)

OTHER PUBLICATIONS

Zhao et al., Spherical Coverage Characteristics of 5G Millimeter Wave User Equipment with 3GPP Specifications, vol. XX (Year: 2017).*
(Continued)

*Primary Examiner* — Mohammed Rachedine
(74) *Attorney, Agent, or Firm* — Lee, Hong, Degerman, Kang & Waimey PC

(57) ABSTRACT

One disclosure of the present specification provides a method for a wireless device to transmit capability information. The method may comprise the steps of: generating the capability information including power class information; and transmitting the capability information to a serving cell. The power class information may be configured for each new radio access technology (NR) band. The power class information may be determined on the basis of minimum peak effective isotropic radiated power (EIRP), maximum output limit, and spherical coverage.

10 Claims, 11 Drawing Sheets

(51) Int. Cl.
*H04W 52/26* (2009.01)
*H04B 17/10* (2015.01)

(56) References Cited

U.S. PATENT DOCUMENTS

| | | | |
|---|---|---|---|
| 10,750,501 B2 | 8/2020 | Tong et al. | |
| 2014/0036827 A1* | 2/2014 | Han | H04W 52/367 |
| | | | 370/329 |
| 2014/0226516 A1 | 8/2014 | Hwang et al. | |
| 2015/0117247 A1* | 4/2015 | Wang | H04W 76/14 |
| | | | 370/252 |
| 2017/0208553 A1* | 7/2017 | Peitzer | H04W 52/247 |
| 2019/0268950 A1 | 8/2019 | Youtz et al. | |
| 2020/0413350 A1 | 12/2020 | Yang et al. | |

FOREIGN PATENT DOCUMENTS

| | | | | |
|---|---|---|---|---|
| CN | 109076539 A * | 12/2018 | | H04W 16/32 |
| EP | 3780776 A1 * | 2/2021 | | H04W 52/146 |
| WO | WO-2012125191 A1 * | 9/2012 | | H01P 11/001 |
| WO | 2017/048013 | 3/2017 | | |
| WO | 2018031788 | 2/2018 | | |
| WO | WO-2018028325 A1 * | 2/2018 | | |
| WO | 2018060832 | 4/2018 | | |
| WO | 2018061322 | 4/2018 | | |
| WO | 2018143853 | 8/2018 | | |
| WO | 2019193723 | 10/2018 | | |

OTHER PUBLICATIONS

Zhao, et al., "Spherical Coverage Characterization of 5G Millimeter Wave User Equipment with 3GPP Specifications," IEEE Access, Dec. 2018, 13 pages.
United States Patent and Trademark Office U.S. Appl. No. 16/980,800, Office Action dated Nov. 18, 2020, 20 pages.
United States Patent and Trademark Office U.S. Appl. No. 16/980,800, Notice of Allowance dated Mar. 4, 2021, 12 pages.
PCT International Application No. PCT/KR2019/004537, International Search Report dated Jul. 11, 2019, 2 pages.
3GPP; TSGRAN; NR; "User Equpiment (UE) radio transmission and reception; Part 2: Range 2 Standalone;" Release 15, 3GPP TS 38.101-2 V15.1.0 (Mar. 2018), Apr. 6, 2018, 48 pages.
Intel Corporation, "On FR2 power class for FWA devices," 3GPP TGS-RAN WG4 Meeeting #86, R4-1801787, Athens, Greece, Feb. 26-Mar. 2, 2018, 6 pages.
Intel Corporation, "CR to 36.101 on default power class," 3GPP TGS-RAN WG4 Meeeting #86, R4-1803212, Athens, Greece, Feb. 26-Mar. 2, 2018, 9 pages.

* cited by examiner

METHOD FOR TRANSMITTING CAPABILITY INFORMATION INCLUDING POWER CLASS INFORMATION AND WIRELESS DEVICE

CROSS-REFERENCE TO RELATED APPLICATIONS

This application is a continuation of U.S. patent application Ser. No. 16/980,800, filed on Sep. 14, 2020, which is the National Stage filing under 35 U.S.C. 371 of International Application No. PCT/KR2019/004537, filed on Apr. 16, 2019, which claims the benefit of earlier filing date and right of priority to Korean Application No. 10-2018-0054267, filed on May 11, 2018, the contents of which are all hereby incorporated by reference herein in their entirety.

BACKGROUND OF THE DISCLOSURE

Field of the Disclosure

The present disclosure relates to mobile communication

Related Art

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The operating band for NR includes an operating band reframed from the operating band of the LTE/LTE-A (hereinafter, it is called an FR1 band) and a high frequency band such as mmWave (hereinafter, it is called an FR2 band).

Currently, the power class for the FR1 band has been defined and used with reference to the existing LTE/LTE-A, but there is a problem that a power class for the FR2 band has not been proposed yet.

SUMMARY OF THE DISCLOSURE

Accordingly, a disclosure of the present specification has been made in an effort to solve the aforementioned problem.

Accordingly, in an effort to solve the aforementioned problem, a disclosure of the present specification provides a method for transmitting capability information. The method may be performed by a wireless device and comprise: generating the capability information including power class information and transmitting the capability information to a serving cell. The power class information may be configured per a new radio access technology (NR) band. The power class information may be determined based on a minimum peak effective isotropic radiated power (EIRP), a maximum output power limit and a spherical coverage.

The maximum output power limit may include a total radiated power (TRP) and an EIRP.

The NR band may include an n257, an n258, an n260 and an n261.

The n257 may include a frequency range of 26500 MHz through 29500 MHz, the n258 may include a frequency range of 24250 MHz through 27500 MHz, the n260 may include a frequency range of 37000 MHz through 40000 MHz, and the n261 may include a frequency range of 27500 MHz through 28350 MHz.

The power class information may include at least one of four (4) power classes.

Each of the four (4) power classes may include similar values of EIRP.

Each of the four power classes may include spherical coverage similar to each other.

The spherical coverage may be determined at 20%-tile cumulative distribution function (CDF) in the half-spherical coverage. Or the spherical coverage may be determined at 60%-tile CDF in the full spherical coverage.

Also, in an effort to solve the aforementioned problem, a disclosure of the present specification provides a wireless device for transmitting capability information. The wireless device may comprise: a processor configured to generate the capability information including power class information; and a transceiver configured to be controlled by the processor thereby transmitting the capability information to a serving cell. The power class information may be configured per a new radio access technology (NR) band. The power class information may be determined based on a minimum peak effective isotropic radiated power (EIRP), a maximum output power limit and a spherical coverage.

According to the disclosure of the present disclosure, the problem of the conventional technology described above may be solved.

DESCRIPTION OF EXEMPLARY EMBODIMENTS

Figure 1:
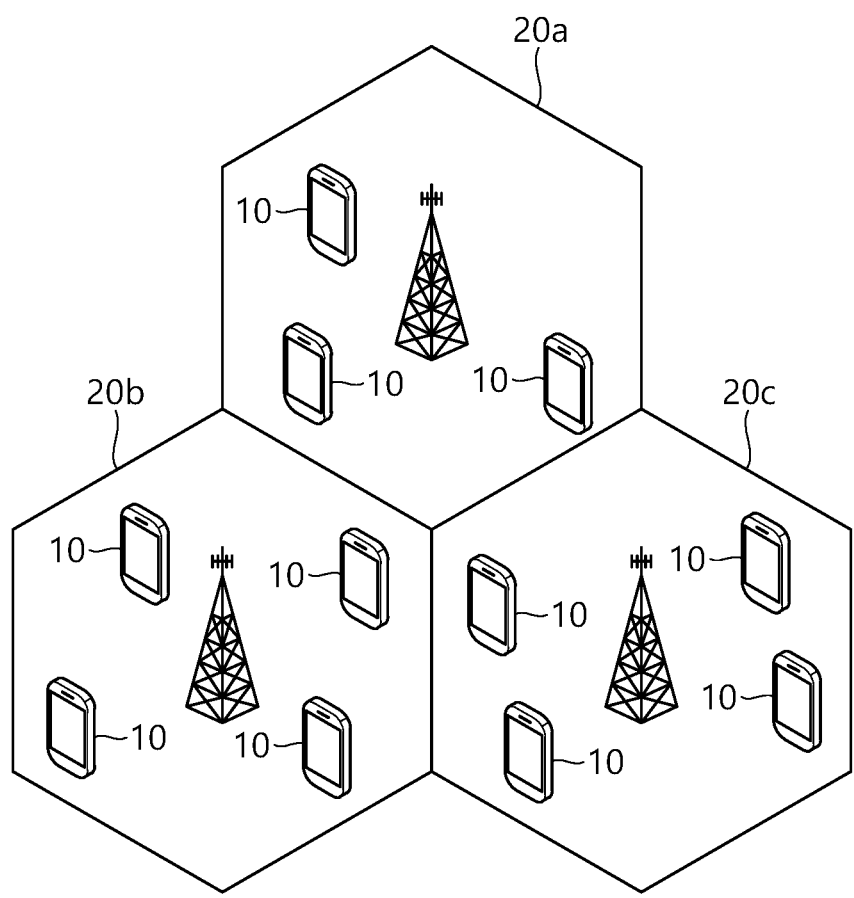
FIG. 1 is a wireless communication system.

Hereinafter, based on 3rd Generation Partnership Project (3GPP) long term evolution (LTE) or 3GPP LTE-advanced (LTE-A), the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
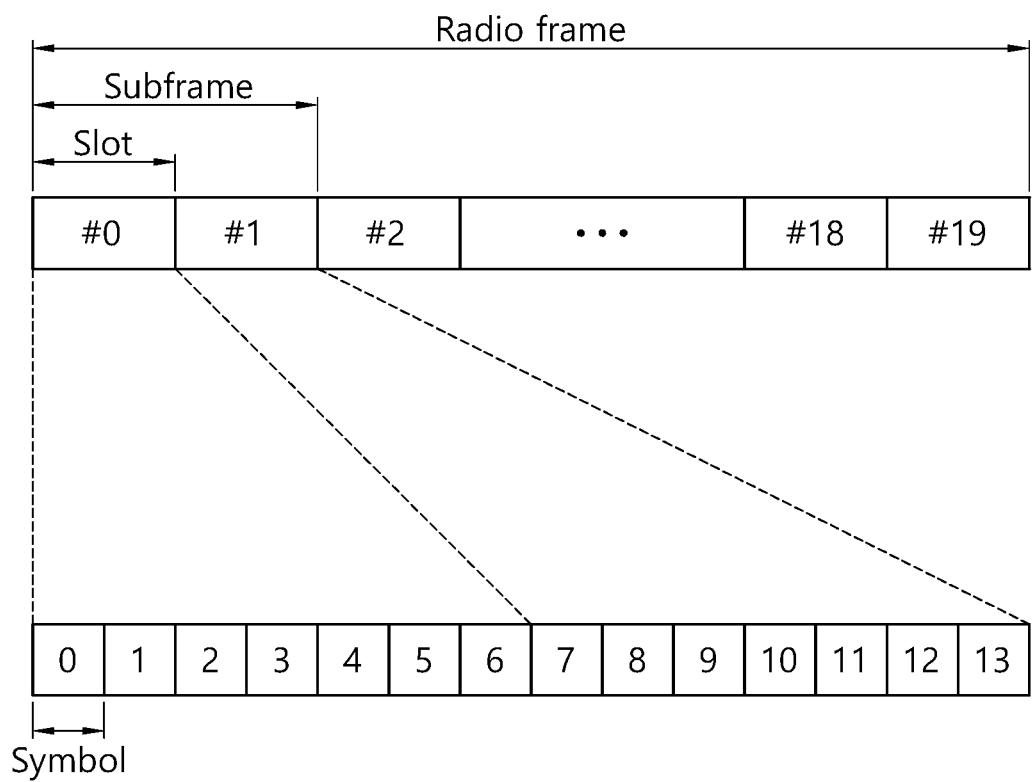
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (S cell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Next-Generation Mobile Communication Network>

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

Figure 3A:
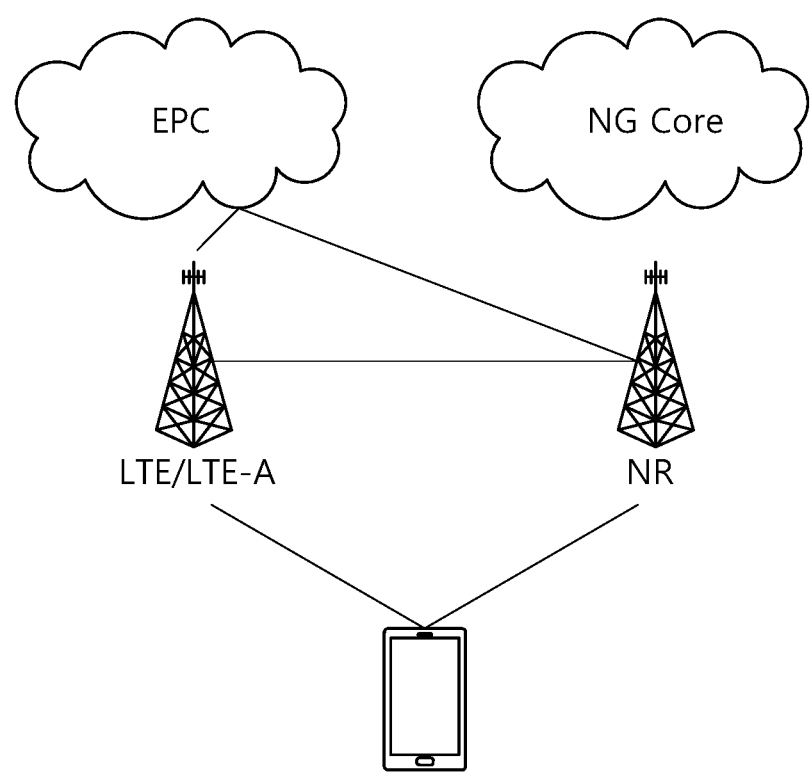
FIGS. 3A to 3C are diagrams illustrating exemplary architecture for a service of the next-generation mobile communication.
Figure 3B:
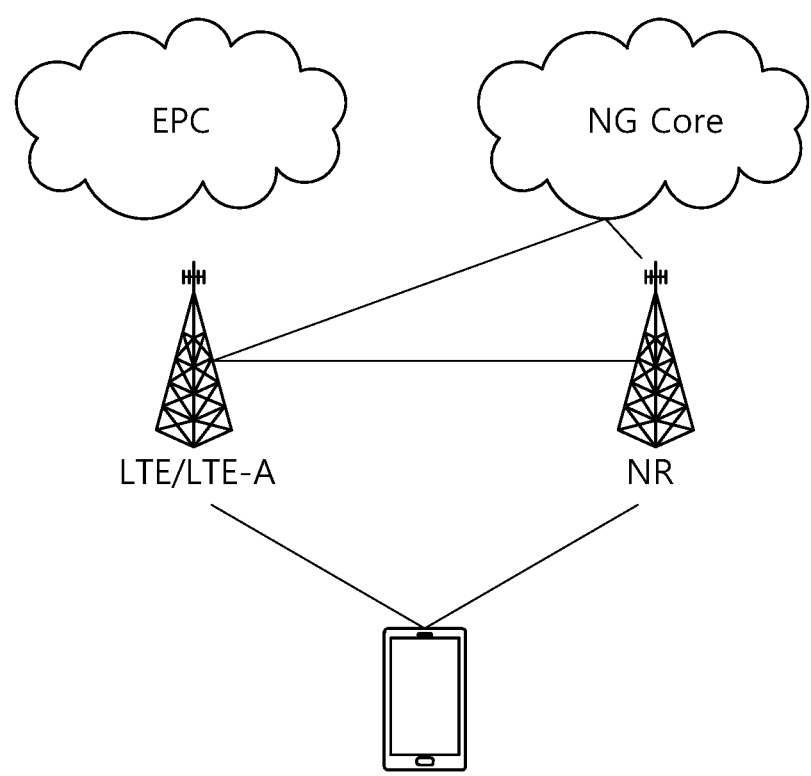
Figure 3C:
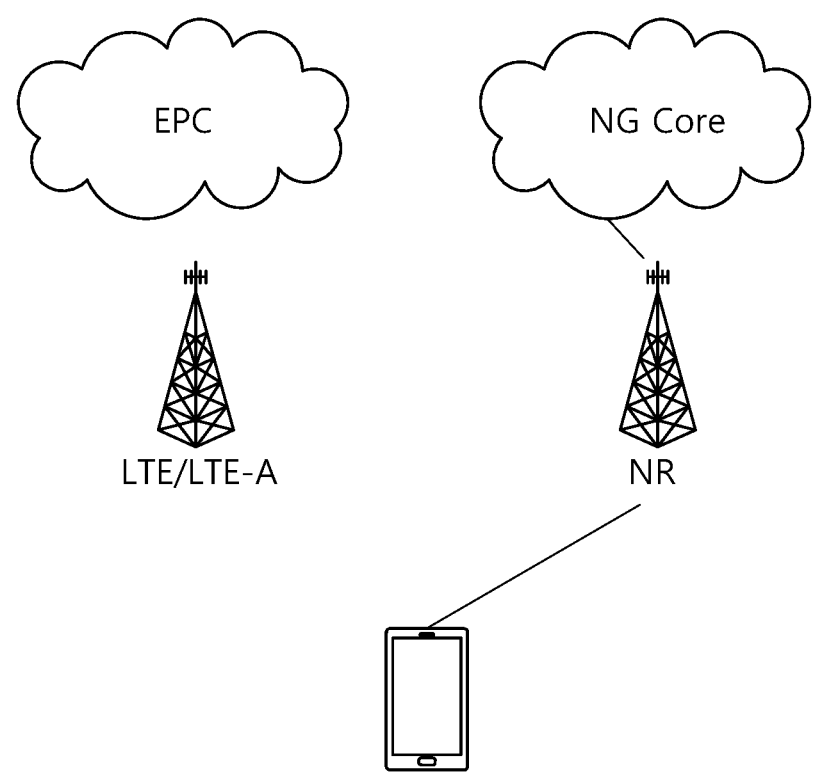

FIGS. 3A to 3C are diagrams illustrating exemplary architecture for a next-generation mobile communication service.

Referring to FIG. 3A, a UE is connected in dual connectivity (DC) with an LTE/LTE-A cell and a NR cell.

The NR cell is connected with a core network for the legacy fourth-generation mobile communication, that is, an Evolved Packet core (EPC).

Referring to FIG. 3B, the LTE/LTE-A cell is connected with a core network for 5th generation mobile communication, that is, a Next Generation (NG) core network, unlike the example in FIG. 4A.

A service based on the architecture shown in FIGS. 3A and 3B is referred to as a non-standalone (NSA) service.

Referring to FIG. 3C, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

Figure 4:
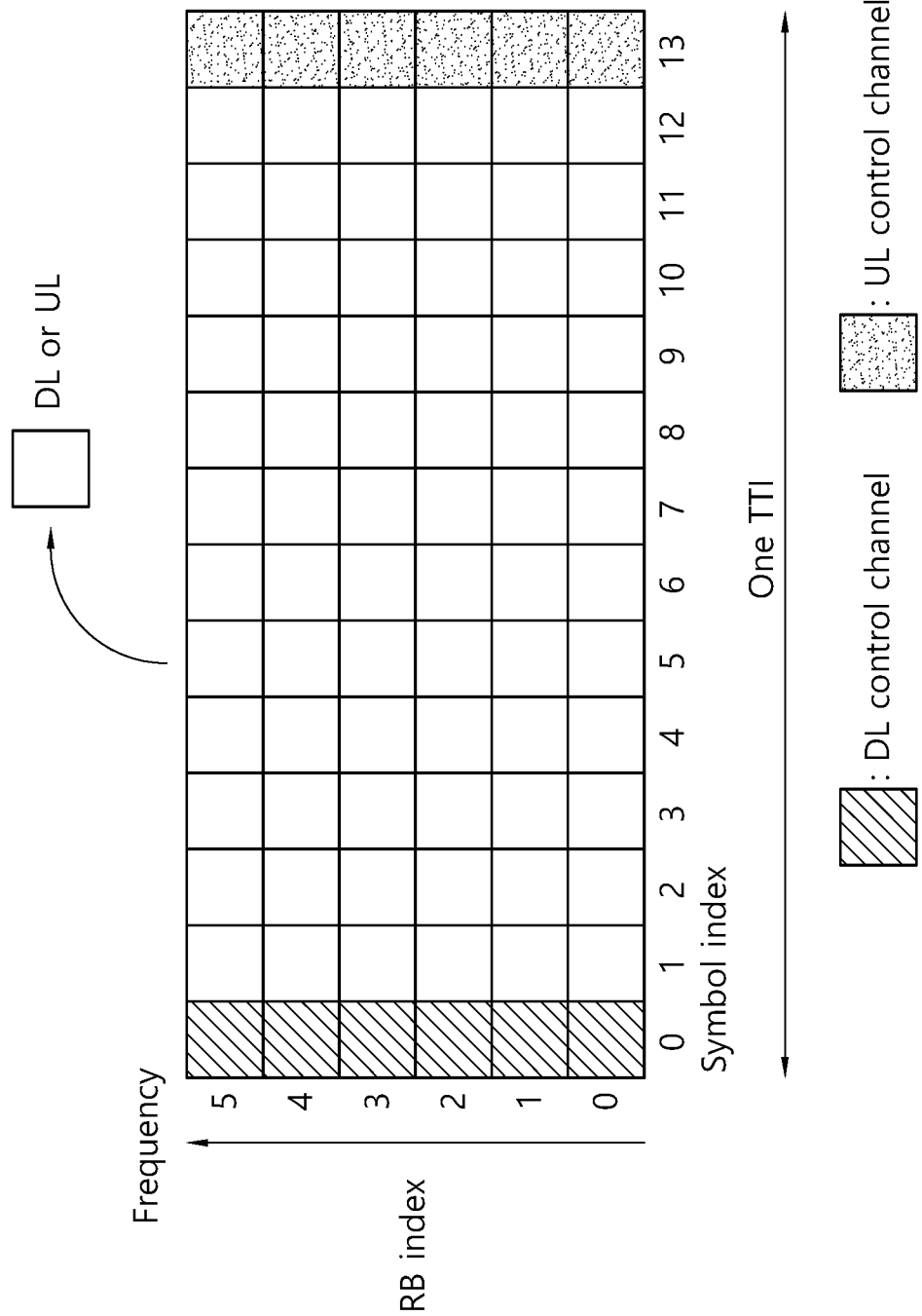
FIG. 4 illustrates an example of a subframe type in NR.

FIG. 4 shows an example of subframe type in NR.

Figure 5:
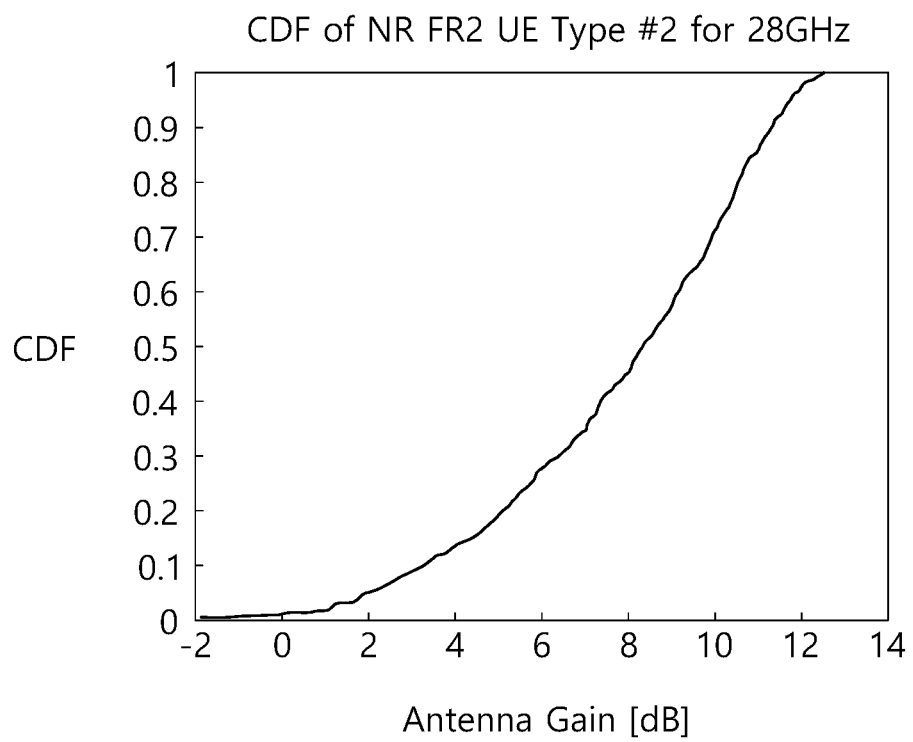
FIG. 5 shows an antenna gain for UE type #2 in the FR2 frequency band.

A transmission time interval (TTI) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission.

According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by a subcarrier spacing and a corresponding CP length may be expressed as shown in the following table.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by $\mu$, the number of OLDM symbols per slot $N^{slot}_{symb}$, the number of slots per frame $N^{frame,\mu}_{slot}$, and the number of slots per subframe $N^{frame,\mu}_{slot}$ are expressed as shown in the following table.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by the number of OLDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 3

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 4

| | Symbol Number in Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |

TABLE 4-continued

| Format | \multicolumn{14}{c}{Symbol Number in Slot} |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

<Operating Band in NR>

An operating band in NR is as follows.

An operating band shown in Table 5 is a reframing operating band that is transitioned from an operating band of LTE/LTE-A. This operating band is referred to as FR1 band.

TABLE 5

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |

TABLE 5-continued

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The following table shows an NR operating band defined at high frequencies. This operating band is referred to as FR2 band.

TABLE 6

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

Meanwhile, when the operating band shown in the above table is used, a channel bandwidth is used as shown in the following table.

TABLE 7

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS indicates a subcarrier spacing. In the above table, NRB indicates the number of RBs.

Meanwhile, when the operating band shown in the above table is used, a channel bandwidth is used as shown in the following table.

TABLE 8

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

Technical Problem to be Solved by the Present Disclosure

There may be various types of UEs using NR, including handheld UEs, Fixed Wireless Access (FWA) devices, and vehicle mounted devices. Depending on the type of a UE, transmission power class may be set differently, which may be determined based on the minimum peak Effective Isotropic Radiated Power (EIRP) value due to beamforming supported by NR and the cumulative distribution function (CDF) value of a measured EIRP.

Depending on the type of a UE, the spherical range may be divided into full sphere and half sphere types, and the EIRP value corresponding to x %-tile CDF may be used for distinguishing the power class of the UE.

In NR FR2, the minimum peak EIRP for each band is defined as follows.

TABLE 9

| NR band | Handheld Minimum peak EIRP (dBm) |
|---|---|
| n257 | [21.2-25.2] range |
| n258 | [21.2-25.2] range |
| n260 | [19.4-23.7] range |
| n261 | [21.2-25.2] range |

In the table above, the minimum peak EIRP is defined as the lower limit without tolerance. NR UE maximum output power limit is as follows.

TABLE 10

| NR band | Total Radiated Power (TRP) handheld (dBm) | EIRP (dBm) handheld |
|---|---|---|
| n257 | 23 | 43 |
| n258 | 23 | 43 |
| n260 | 23 | 43 |
| n261 | 23 | 43 |

On the other hand, UE types may be divided as follows.

Important criteria for distinguishing types of UEs may include the minimum peak EIRP level and spherical coverage.

For example, as shown in the table below, handheld UEs may be classified as type 1, and fixed-type UEs may be classified as type 4.

TABLE 11

| # | Minimum peak EIRP (dBm) | Spherical coverage | Maximum allowed EIRP (dBm) | Maximum allowed TRP (dBm) | Description |
|---|---|---|---|---|---|
| 1 | [22.0-22.4] range | Full spherical coverage | 43 | 23 | Handheld UE |
| 2 | [26-30] range | Half-spherical coverage | 43 | 23 | Vehicle-mounted terminal (terminal fixed to a mobile object) |
| 3 | [~35] range | Full spherical coverage | 43 | 23 | High power mobile terminal or UE |
| 4 | [30-40] range | Half-spherical coverage | 55 | 35 | FWA on a fixed device |

As described above, the minimum peak EIRP and the spherical coverage are important elements for distinguishing UE types. However, in determining power classes for NR UEs, these elements have not been taken into account.

DESCRIPTION OF THE PRESENT DISCLOSURE

In what follows, the present disclosure proposes a method for defining power classes for NR UEs in the mmWave band.

More specifically, the present disclosure proposes methods for using the minimum peak EIRP, the maximum output power limit, and the spherical coverage to determine the NR UE type.

1. First Disclosure

The first disclosure proposes to assume the same UE type without classifying UEs into a handheld UE, a fixed wireless access (FWA) device, or a vehicle-mounted terminal.

Instead, the first disclosure proposes to define various terminals with similar minimum peak EIRP values as belonging to a single UE type. According to this disclosure, an advantageous effect is obtained that the number of signaling bits is reduced.

A UE type is distinguished by the minimum peak EIRP.

UEs belonging to the same UE type exhibit the same minimum peak EIRP and spherical coverage.

Signaling is required to distinguish UE types.

For example, the descriptions above are summarized in the following table.

TABLE 12

| | Minimum peak EIRP power class (dBm) | | | |
|---|---|---|---|---|
| NR band | UE type 1 | UE type 2 | UE type 3 | UE type 4 |
| n257 | [21.2-25.2] range | [28] | [~35] range | |
| n258 | [21.2-25.2] range | | | |
| n260 | [19.4-23.7] range | | | [30-40] range |
| n261 | [21.2-25.2] range | | | [30-40] range |

In the table above, the minimum peak EIRP is defined as a lower limit without tolerance.

The table below shows the maximum output power limit.

TABLE 13

| | UE type 1 | | UE type 2 | | UE type 3 | | UE type 4 | |
|---|---|---|---|---|---|---|---|---|
| NR band | TRP (dBm) | EIRP (dBm) | TRP (dBm) | EIRP (dBm) | TRP (dBm) | EIRP (dBm) | TRP (dBm) | EIRP (dBm) |
| n257 | 23 | 43 | 23 | 43 | 23 | 43 | | |
| n258 | 23 | 43 | | | | | | |
| n260 | 23 | 43 | | | | | 35 | 55 |
| n261 | 23 | 43 | | | | | 35 | 55 |

The table below shows the spherical coverage in the FR2 band.

TABLE 14

| NR band | The minimum EIRP at x %-tile CDF (dBm, x %) | | | |
|---|---|---|---|---|
| | UE type 1 | UE type 2 | UE type 3 | UE type 4 |
| n257 | (To be defined, 50) | (To be defined, 20) | (To be defined, 50) | |
| n258 | (To be defined, 50) | | | |
| n260 | (To be defined, 50) | | | (To be defined, 90) |
| n261 | (To be defined, 50) | | | (To be defined, 90) |

In the table above, the minimum EIRP is defined as a lower limit at x %-tile CDF without tolerance. And for the UE type 1 and the UE type 3, full spherical coverage is applied while, for other types, half spherical coverage is applied.

1-a. Modification of the First Disclosure

In a modified example of the first disclosure, the same UE type is assumed without taking into account handheld UEs, fixed wireless access (FWA) devices, and vehicle-mounted terminals. Instead, the modified example of the first disclosure proposes to use the minimum peak EIRP.

In other words, according to the modified example of the first disclosure, various UEs with similar minimum peak EIRP values are considered to belong to the same UE type. According to the modified example, an advantageous effect is obtained that the number of signaling bits is reduced.

A UE type is distinguished by the minimum peak EIRP.

UEs belonging to the same UE type exhibit the same minimum peak EIRP value. However, even for UEs belonging to the same UE type, their spherical coverage is different from each other in terms of x %-tile CDF.

Signaling is required to distinguish UE types. Also, signaling is required to distinguish x %-tile CDFs.

For example, the descriptions above are summarized in the following table.

TABLE 15

| | Minimum peak EIRP power class (dBm) | | | |
|---|---|---|---|---|
| NR band | UE type 1 | UE type 2 | UE type 3 | UE type 4 |
| n257 | [21.2-25.2] range | [28] | [~35] range | |
| n258 | [21.2-25.2] range | | | |
| n260 | [19.4-23.7] range | | | [30-40] range |
| n261 | [21.2-25.2] range | | | [30-40] range |

In the table above, the minimum peak EIRP is defined as a lower limit without tolerance.

The table below shows the maximum output power limit.

TABLE 16

| | UE type 1 | | UE type 2 | | UE type 3 | | UE type 4 | |
|---|---|---|---|---|---|---|---|---|
| NR band | TRP (dBm) | EIRP (dBm) | TRP (dBm) | EIRP (dBm) | TRP (dBm) | TRP (dBm) | EIRP (dBm) | TRP (dBm) |
| n257 | 23 | 43 | 23 | 43 | 23 | 43 | | |
| n258 | 23 | 43 | | | | | | |
| n260 | 23 | 43 | | | | | 35 | 55 |
| n261 | 23 | 43 | | | | | 35 | 55 |

The table below shows the spherical coverage in the FR2 band.

TABLE 17

| NR band | The minimum EIRP at x %-tile CDF (dBm, x %) | | | |
|---|---|---|---|---|
| | UE type 1 | UE type 2 | UE type 3 | UE type 4 |
| n257 | (To be defined, 50) | (To be defined, 20) | (To be defined, 50) | (To be defined, 90) |

TABLE 17-continued

| NR band | The minimum EIRP at x %-tile CDF (dBm, x %) | | | |
|---|---|---|---|---|
| | UE type 1 | UE type 2 | UE type 3 | UE type 4 |
| n258 | (To be defined, 50) | | | |
| n260 | (To be defined, 50) | | | (To be defined, 90) |
| n261 | (To be defined, 50) | | | (To be defined, 90) |

In the table above, the minimum EIRP is defined as a lower limit at x %-tile CDF without tolerance. And for the UE type 1 and the UE type 3, full spherical coverage is applied while, for other types, half spherical coverage is applied.

2. Second Disclosure

The second disclosure proposes to use power classes instead of using the UE types.

According to the second disclosure, UEs with similar minimum peak EIRP values are defined as belonging to the same power class. According to the definition, an advantageous effect is obtained that the number of signaling bits is reduced.

A power class is distinguished by the minimum peak EIRP.

UEs belonging to the same power class exhibit the same minimum peak EIRP value and the same spherical coverage.

Signaling is required to distinguish power classes.

The table below shows power classes in the FR2 band.

TABLE 18

| NR band | Minimum peak EIRP (dBm) | | | |
|---|---|---|---|---|
| | UE type 1 | UE type 2 | UE type 3 | UE type 4 |
| n257 | [21.2-25.2] range | [28] | [~35] range | |
| n258 | [21.2-25.2] range | | | |
| n260 | [19.4-23.7] range | | | [30-40] range |
| n261 | [21.2-25.2] range | | | [30-40] range |

In the table above, the minimum peak EIRP is defined as a lower limit without tolerance.

The table below shows the maximum output power limit.

TABLE 19

| | Power class 1 | | Power class 2 | | Power class 3 | | Power class 4 | |
|---|---|---|---|---|---|---|---|---|
| NR band | TRP (dBm) | EIRP (dBm) | TRP (dBm) | EIRP (dBm) | TRP (dBm) | EIRP (dBm) | TRP (dBm) | EIRP (dBm) |
| n257 | 23 | 43 | 23 | 43 | 23 | 43 | | |
| n258 | 23 | 43 | | | | | | |
| n260 | 23 | 43 | | | | | 35 | 55 |
| n261 | 23 | 43 | | | | | 35 | 55 |

The table below shows spherical coverage in the FR2 band.

TABLE 20

| NR band | The minimum EIRP at x %-tile CDF (dBm, x %) | | | |
|---|---|---|---|---|
| | Power class 1 | Power class 2 | Power class 3 | Power class 4 |
| n257 | (To be defined, 50) | (To be defined, 20) | (To be defined, 50) | |
| n258 | (To be defined, 50) | | | |
| n260 | (To be defined, 50) | | | (To be defined, 90) |
| n261 | (To be defined, 50) | | | (To be defined, 90) |

In the table above, the minimum EIRP is defined as a lower limit at x %-tile CDF without tolerance. And for the UE type 1 and the UE type 3, full spherical coverage is applied while, for other types, half spherical coverage is applied.

2-a. Modified Example of the Second Disclosure

A modified example of the second disclosure proposes to use a power class without distinguishing UEs such as a handheld UE, a fixed wireless access (FWA) device, and a vehicle-mounted terminal.

According to the second disclosure, UEs with similar minimum peak EIRP values are defined as belonging to the same power class. According to the definition, an advantageous effect is obtained that the number of signaling bits is reduced.

A power class is distinguished by the minimum peak EIRP.

UEs belonging to the same power class exhibit the same minimum peak EIRP value. However, even for UEs belonging to the same power class, their spherical coverage is different from each other in terms of x %-tile CDF.

Signaling is required to distinguish power classes.

The table below shows power classes in the FR2 band.

TABLE 21

| NR band | Minimum peak EIRP (dBm) | | | |
|---|---|---|---|---|
| | Power class 1 | Power class 2 | Power class 3 | Power class 4 |
| n257 | [21.2-25.2] range | [28] | [~35] | |
| n258 | [21.2-25.2] range | | | |
| n260 | [19.4-23.7] range | | | [30-40] |
| n261 | [21.2-25.2] range | | | [30-40] |

In the table above, the minimum peak EIRP is defined as a lower limit without tolerance.

The table below shows the maximum output power limit.

TABLE 22

| NR band | Power class 1 | | Power class 2 | | Power class 3 | | Power class 4 | |
|---|---|---|---|---|---|---|---|---|
| | TRP (dBm) | EIRP (dBm) | TRP (dBm) | EIRP (dBm) | TRP (dBm) | EIRP (dBm) | TRP (dBm) | EIRP (dBm) |
| n257 | 23 | 43 | 23 | 43 | 23 | 43 | | |
| n258 | 23 | 43 | | | | | | |
| n260 | 23 | 43 | | | | | 35 | 55 |
| n261 | 23 | 43 | | | | | 35 | 55 |

The table below shows spherical coverage in the FR2 band.

TABLE 23

| | The minimum EIRP at x %-tile CDF (dBm, x %) | | | |
|---|---|---|---|---|
| NR band | Power class 1 | Power class 2 | Power class 3 | Power class 4 |
| n257 | (To be defined, 50) | To be defined, 20) | (To be defined, 50) | |
| n258 | (To be defined, 50) | (To be defined, 90) | | |
| n260 | (To be defined, 50) | | | (To be defined, 90) |
| n261 | (To be defined, 50) | | | (To be defined, 90) |

In the table above, the minimum EIRP is defined as a lower limit at x %-tile CDF without tolerance. And for the UE type 1 and the UE type 3, full spherical coverage is applied while, for other types, half spherical coverage is applied.

The table below shows the minimum peak EIRP classes in the FR2 band.

TABLE 24

| | Minimum peak EIRP class (dBm) | | | | |
|---|---|---|---|---|---|
| NR band | Power class 1 | Power class 2 | Power class 3 | Power class 4 | Power class 5 |
| n257 | [21.2-25.2] range | [28] | [28] | [~35] | |
| n258 | [21.2-25.2] range | | | | |
| n260 | [19.4-23.7] range | | | | [30-40] range |
| n261 | [21.2-25.2] range | | | | [30-40] range |

In the table above, the minimum peak EIRP is defined as a lower limit without tolerance.

The table below shows the maximum output power limit.

TABLE 25

| NR band | Power class 1 | | Power class 2 | | Power class 3 | | Power class 4 | | Power class 5 | |
|---|---|---|---|---|---|---|---|---|---|---|
| | TRP (dBm) | EIRP (dBm) | TRP (dBm) | EIRP (dBm) | TRP (dBm) | EIRP (dBm) | TRP (dBm) | EIRP (dBm) | TRP (dBm) | EIRP (dBm) |
| n257 | 23 | 43 | 23 | 43 | 23 | 43 | 23 | 43 | | |
| n258 | 23 | 43 | | | | | | | | |
| n260 | 23 | 43 | | | | | | | 35 | 55 |
| n261 | 23 | 43 | | | | | | | 35 | 55 |

3. Third Disclosure

The third disclosure proposes to use power class X.
The X proposes to use the minimum peak EIRP class and the spherical coverage class (percentile in the CDF, full spherical/half spherical coverage) together.
In other words, according to the third class, UEs with similar minimum peak EIRP values and similar spherical coverage (namely, percentile in the CDF and full spherical/half spherical coverage) are defined as belonging to the same power class. According to the definition, an advantageous effect is obtained that the number of signaling bits is reduced.
In the description below, power class 2 and power class 3 are considered to have the same minimum peak EIRP. Also, power class 2 and power class 3 are considered to have different x %-tile CDFs.
For example, power class 2 may be at 20%-tile while power class 3 may be at 90%-tile.

The table below shows spherical coverage in the FR2 band.

TABLE 26

| | The minimum EIRP at x %-tile CDF (dBm, x %) | | | | |
|---|---|---|---|---|---|
| NR band | Power class 1 | Power class 2 | Power class 3 | Power class 4 | Power class 5 |
| n257 | (To be defined, 50) | (To be defined, 20) | (To be defined, 90) | (To be defined, 50) | |
| n258 | (To be defined, 50) | | | | |
| n260 | (To be defined, 50) | | | | (To be defined, 90) |

TABLE 26-continued

| | The minimum EIRP at x %-tile CDF (dBm, x %) | | | | |
|---|---|---|---|---|---|
| NR band | Power class 1 | Power class 2 | Power class 3 | Power class 4 | Power class 5 |
| n261 | (To be defined, 50) | | | | (To be defined, 90) |

In the table above, the minimum EIRP is defined as a lower limit at x %-tile CDF without tolerance. And for power class 1 and power class 3, full spherical coverage is applied while, for other power classes, half spherical coverage is applied.

Based on the three disclosures and formats, it is proposed to define and use power classes. It is proposed to define and use signaling for power class in the form of UE capability for each band.

And a 3-bit configuration is proposed in consideration of future power class scalability (minimum peak EIRP or minimum peak EIRP plus spherical coverage).

In the description above, the application NR band is an actual service band.

Based on the analysis for UE type 2 shown below, one example of the present disclosure proposes to use 28 dBm between 26 and 39 dBm.

For peak EIRP evaluation, parameters for FWA may be used without modification.

TABLE 27

| Parameter | Unit | Frequency range 24.25-29.5 GHz |
|---|---|---|
| Pout per element | dBm | 12 |
| # of antennas in array | | 8 |
| Total conducted power per polarization | dBm | 21 |
| Avg. antenna element gain | dBi | 4.5 |
| Antenna roll-off loss vs frequency | dB | −1.0 |
| Realized antenna array gain | dBi | 12.5 |
| Polarization gain | dB | 2.5 |
| Mismatch and transmission line loss including load pull | dB | −2.5 |
| Beam forming loss (phase shifter and amplitude error) | dB | −0.5 |
| Finite beam table | dB | −0.25 |
| Beam forming loss (one beam table fits all) | dB | −0.25 |
| Form-factor integration losses | dB | −4.5 |
| Total implementation loss (worst-case) | dB | −8.0 |
| Peak EIRP (Minimum) | dBm | 28 |

For UE type #2 in the NR FR2 frequency band, it is assumed that 8 antennas are used in one array, and the overall implementation cost may be smaller than the handheld UE type (NR FR3 UE type #1). Based on the analysis above, it is proposed to use 28 dBm for 28 GHz as the minimum peak EIRP for UE type #2 in the NR FR2 frequency band.

Proposal 1: It is proposed to use about 28 dBm for 28 GHz as the minimum peak EIRP for UE type #2 in the NR FR2 frequency band.

Based on the table above and the analysis given below, 20.5 dBm is proposed at 20%-tile CDF.

FIG. 5 shows an antenna gain for UE type #2 in the FR2 frequency band.

In the NR FR2 frequency band, half spherical coverage is proposed for UE type #2. An antenna gain for 28 GHz based on the half spherical coverage is shown in FIG. 5.

With reference to the CDF curve, as shown in the table below, the EIRP value corresponding to 20%-tile CDF of the half spherical coverage may be determined. The 20%-tile CDF of the half spherical coverage may correspond to 60%-tile CDF of full spherical coverage.

The table below shows requirements related to spherical coverage.

TABLE 28

| Half spherical coverage | |
|---|---|
| CDF percentile (%) | EIRP at the % (dBm) |
| [20] | [20.5] dBm |

Proposal 2: It is proposed to define and use about 20.5 dBm as the EIRP at about 20%-tile CDF for 28 GHz with respect to spherical coverage of UE type #2 in the NR FR2 frequency band.

Considering the implementation margin of about 1 dB, the EIRP may be 19.5 dBm at about 20%-tile CDF for 28 GHz.

Figure 6:
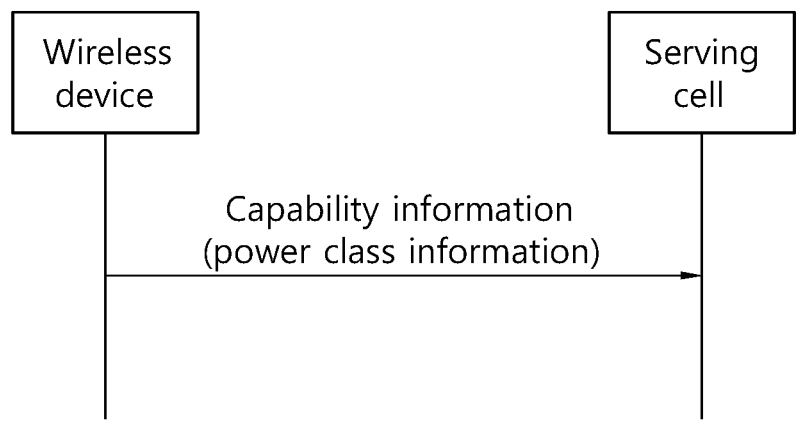
FIG. 6 illustrates a method according to the proposals of the present disclosure.

FIG. 6 illustrates a method according to the proposals of the present disclosure.

Referring to FIG. 6, after generating capability information including power class information, a wireless device may transmit the generated information to a serving cell. The power class information may be set for each new radio access technology (NR) band. The power class information may be determined based on the minimum peak effective isotropic radiated power (EIRP), maximum output limit, and spherical coverage.

The maximum output power limit may include total radiated power (TRP) and EIRP.

The NR band may include n257, n258, n260, and n261.

The n257 band may include a frequency range of 26500 MHz through 29500 MHz. The n258 band may include a frequency range of 24250 through 27500 MHz. The n260 band may include a frequency range of 37000 MHz through 40000 MHz. The n261 band may include a frequency band of 27500 MHz through 28350 MHz.

The power class information may include at least one of four power classes.

Each of the four power classes may have an EIRP value similar to each other.

Each of the four power classes may have spherical coverage similar to each other.

The spherical coverage may be determined based on 20% of Cumulative Distribution Function (CDF) in the half coverage (60%-tile CDF in terms of spherical coverage).

The above-described embodiments of the present disclosure may be implemented by use of various means. For example, the embodiments of the present disclosure may be implemented by hardware, firmware, and software or a combination thereof. A detailed description thereof will be provided with reference to drawings.

Figure 7:
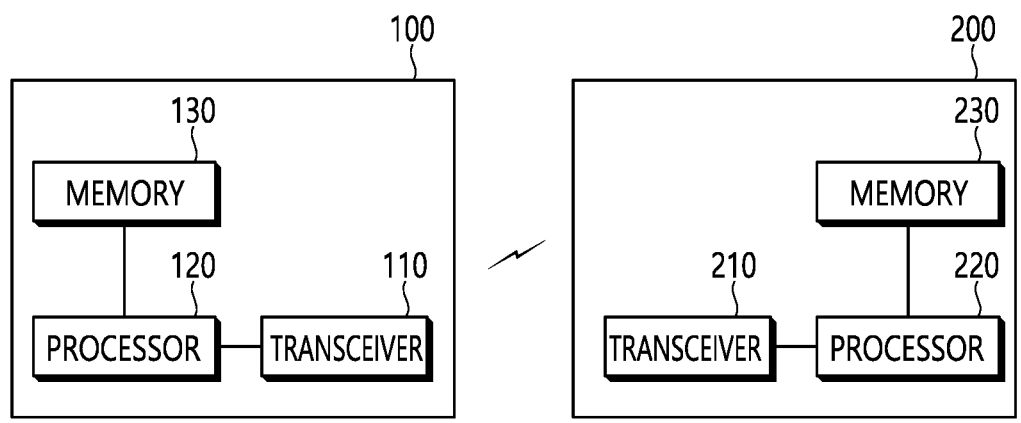
FIG. 7 is a block diagram illustrating a wireless device and a base station, by which the present disclosure is implemented.

FIG. 7 is a block diagram illustrating a wireless device and a base station, by which the disclosure of this specification can be implemented.

Referring to FIG. 7, a wireless device 100 and a base station 200 may implement the disclosure of this specification.

The wireless device 100 includes a processor 101, a memory 102, and a transceiver 103. Likewise, the base station 200 includes a processor 201, a memory 202, and a transceiver 203. The processors 101 and 201, the memories 102 and 202, and the transceivers 103 and 203 may be implemented as separate chips, or at least two or more blocks/functions may be implemented through one chip.

Each of the transceivers 103 and 203 includes a transmitter and a receiver. When a particular operation is performed, either or both of the transmitter and the receiver may operate. Each of the transceivers 103 and 203 may include one or more antennas for transmitting and/or receiving a radio signal. In addition, each of the transceivers 103 and 203 may include an amplifier configured for amplifying a Rx signal and/or a Tx signal, and a band pass filter for transmitting a signal to a particular frequency band.

Each of the processors 101 and 201 may implement functions, procedures, and/or methods proposed in this specification. Each of the processors 101 and 201 may include an encoder and a decoder. For example, each of the processors 101 and 202 may perform operations described above. Each of the processors 101 and 201 may include an application-specific integrated circuit (ASIC), a different chipset, a logic circuit, a data processing device, and/or a converter which converts a base band signal and a radio signal into each other.

Each of the memories 102 and 202 may include a Read-Only Memory (ROM), a Random Access Memory (RAM), a flash memory, a memory card, a storage medium, and/or any other storage device.

Figure 8:
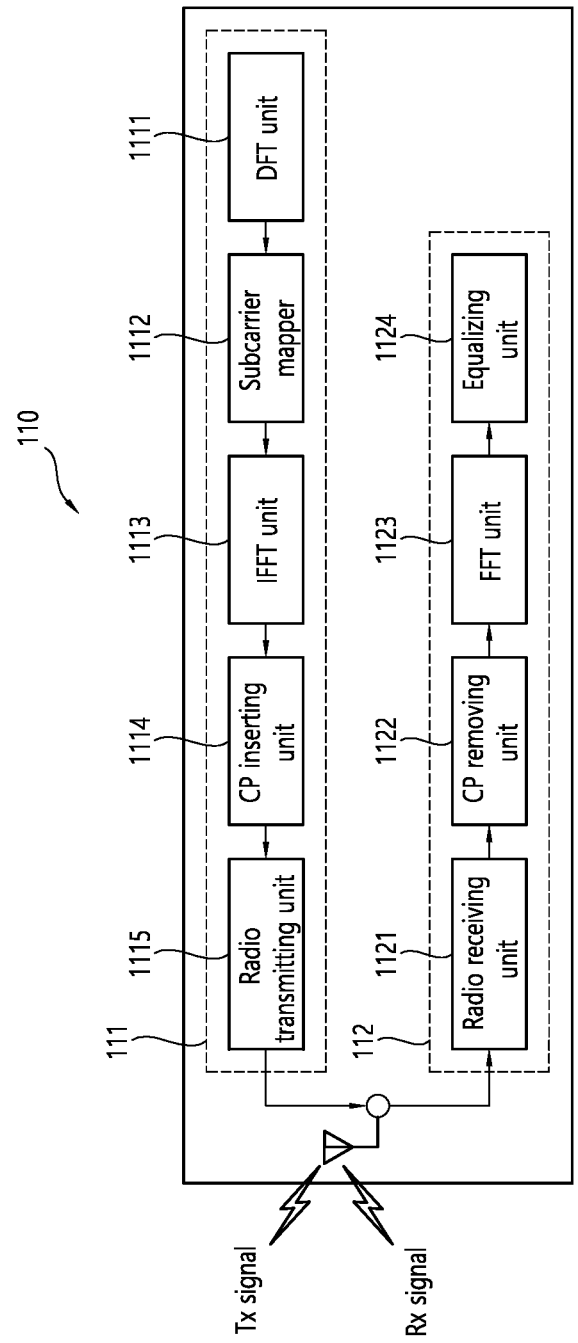
FIG. 8 is a detailed block diagram illustrating a transceiver of the wireless device shown in FIG. 7.

FIG. 8 is a detailed block diagram illustrating a transceiver of the wireless device shown in FIG. 7.

Referring to FIG. 8, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFFT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

Figure 9:
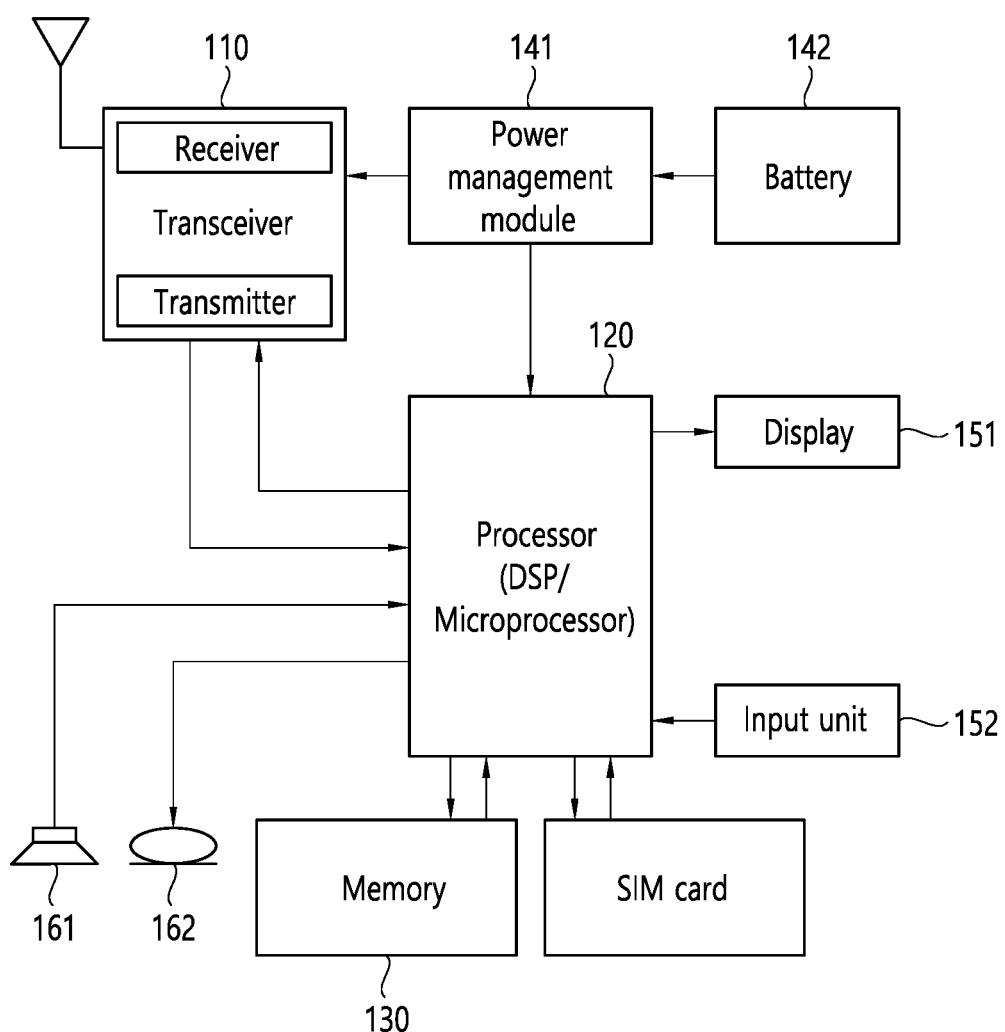
FIG. 9 is a detailed block diagram illustrating a structure of a UE according to an embodiment of the present disclosure.

FIG. 9 is a detailed block diagram illustrating a structure of a UE according to an embodiment of the present disclosure.

A UE includes a transceiver 110, a processor 120, a memory 130, a power management module 141, a battery 142, a display 151, an input unit 152, a speaker 161 and a microphone 162, a subscriber identification module (SIM) card, and one or more antennas.

The processor 120 may be configured to implement functions, processes and/or methods described in the present disclosure. Layers of a wireless interface protocol may be implemented by the processor 120. The processor 120 may include Application-Specific Integrated Circuit (ASIC), other chipsets, logical circuits and/or data processing devices. The processor 102 may be an application processor (AP). The processor 120 may include at least one of a digital signal processor (DSP), a central processing unit (CPU), a graphics processing unit (GPU), and a modulator and demodulator (MODEM). Examples of the processor 120 may include SNAPDRAGON™-series processors manufactured by Qualcomm®, EXYNOS™-series processors manufactured by Samsung®, A-series processors manufactured by Apple®, HELIO™-series processors manufactured by MediaTek®, ATOM™-series processors manufactured by INTEL®, or corresponding next-generation processors.

The power management module 141 manages power for the processor 120 and/or the transceiver 110. The battery 142 supplies power to the power management module 141. The display 151 outputs a result processed by the processor 120. The input unit 152 receives inputs to be used by the processor 120. The input unit 152 may be displayed on the display 151. The SIM card is an integrated circuit used for safely storing International Mobile Subscriber Identity (IMSI) used for identifying and authenticating a subscriber in a mobile phone or a portable phone device such as a computer; and keys related to the IMSI. Many pieces of contact information may be stored in the SIM card.

The memory 130 is coupled operatively to the processor 120 and stores various pieces of information for operating the processor 120. The memory 130 may include Read-Only Memory (ROM), Random Access Memory (RAM), flash memory, memory card, storage medium and/or other storage device. When an embodiment is implemented by software, the methods described in the present disclosure may be implemented by a module (for example, a process or a function) which performs the function described in the present disclosure. The module may be stored in the memory 130 and executed by the processor 120. The memory 130 may be implemented inside the processor 120. Or, the memory 130 may be implemented outside the processor 120 and may be connected communicatively to the processor 120 through various means well known to the corresponding technical field.

The transceiver 110 is coupled operatively to the processor 120 and transmits and/or receives a radio signal. The transceiver 110 includes a transmitter and a receiver. The transceiver 110 may include a baseband circuit for processing a radio frequency signal. The transceiver controls one or more antennas to transmit and/or receive a radio signal.

The speaker 161 outputs a sound-related output processed by the processor 120. The microphone 162 receives a sound-related input to be used by the processor 120.

In the descriptions given above, preferred embodiments of the present disclosure have been described, but the technical scope of the present disclosure is not limited only to the specific embodiments. Therefore, the present disclosure may be modified, changed, or updated in various ways within the technical principles and scope defined by the appended claims.

What is claimed is:

1. A method for transmitting capability information, the method performed by a wireless device and comprising:
generating the capability information of the wireless device including power class information; and
transmitting the capability information to a serving cell,
wherein the power class information is configured per a new radio access technology (NR) band, wherein the power class information informs a power class 2 (PC2),
wherein the power class information is related to a minimum peak effective isotropic radiated power (EIRP), a-maximum output power limit limits and a spherical coverage,
wherein the maximum output power limits include Max TRP (Total radiated power) for the PC2 and Max EIRP for the PC2,
wherein the Max TRP is 23 dBm and the Max EIRP is 43 dBm,
wherein the spherical coverage for the PC2 is indicated 60%-tile of a cumulative distribution function (CDF) in a full spherical coverage.

2. The method of claim 1,
wherein the NR band includes an n257, an n258, and an n261.

3. The method of claim 2,
wherein the n257 includes a frequency range of 26500 MHz through 29500 MHz,
wherein the n258 includes a frequency range of 24250 MHz through 27500 MHz,
wherein the n260 includes a frequency range of 37000 MHz through 40000 MHz, and
wherein the n261 includes a frequency range of 27500 MHz through 28350 MHz.

4. The method of claim 1, wherein the power class information includes similar values of EIRP.

5. The method of claim 1, wherein the power class information includes similar spherical coverages.

6. A wireless device for transmitting capability information, the wireless device comprising:
a processor configured to generate the capability information of the wireless device including power class information; and
a transceiver configured to be controlled by the processor thereby transmitting the capability information to a serving cell,
wherein the power class information is configured per a new radio access technology (NR) band,
wherein the power class information informs a power class 2 (PC2),
wherein the power class information is related to a minimum peak effective isotropic radiated power (EIRP), maximum output power limits and a spherical coverage,
wherein the maximum output power limits include Max TRP (Total radiated power) for the PC2 and Max EIRP for the PC2,
wherein the Max TRP is 23 dBm and the Max EIRP is 43 dBm,
wherein the spherical coverage for power class 2 is indicated 60%-tile of a cumulative distribution function (CDF) in a full spherical coverage.

7. The wireless device of claim 6,
wherein the maximum output power limit includes a total radiated power (TRP) and an EIRP.

8. The wireless device of claim 6,
wherein the NR band includes an n257, an n258, and an n261.

9. The wireless device of claim 8,
wherein the n257 includes a frequency range of 26500 MHz through 29500 MHz,
wherein the n258 includes a frequency range of 24250 MHz through 27500 MHz,
wherein the n260 includes a frequency range of 37000 MHz through 40000 MHz, and
wherein the n261 includes a frequency range of 27500 MHz through 28350 MHz.

10. The wireless device of claim 6,
wherein the power class information includes similar values of EIRP.

* * * * *